UNITED STATES PATENT OFFICE.

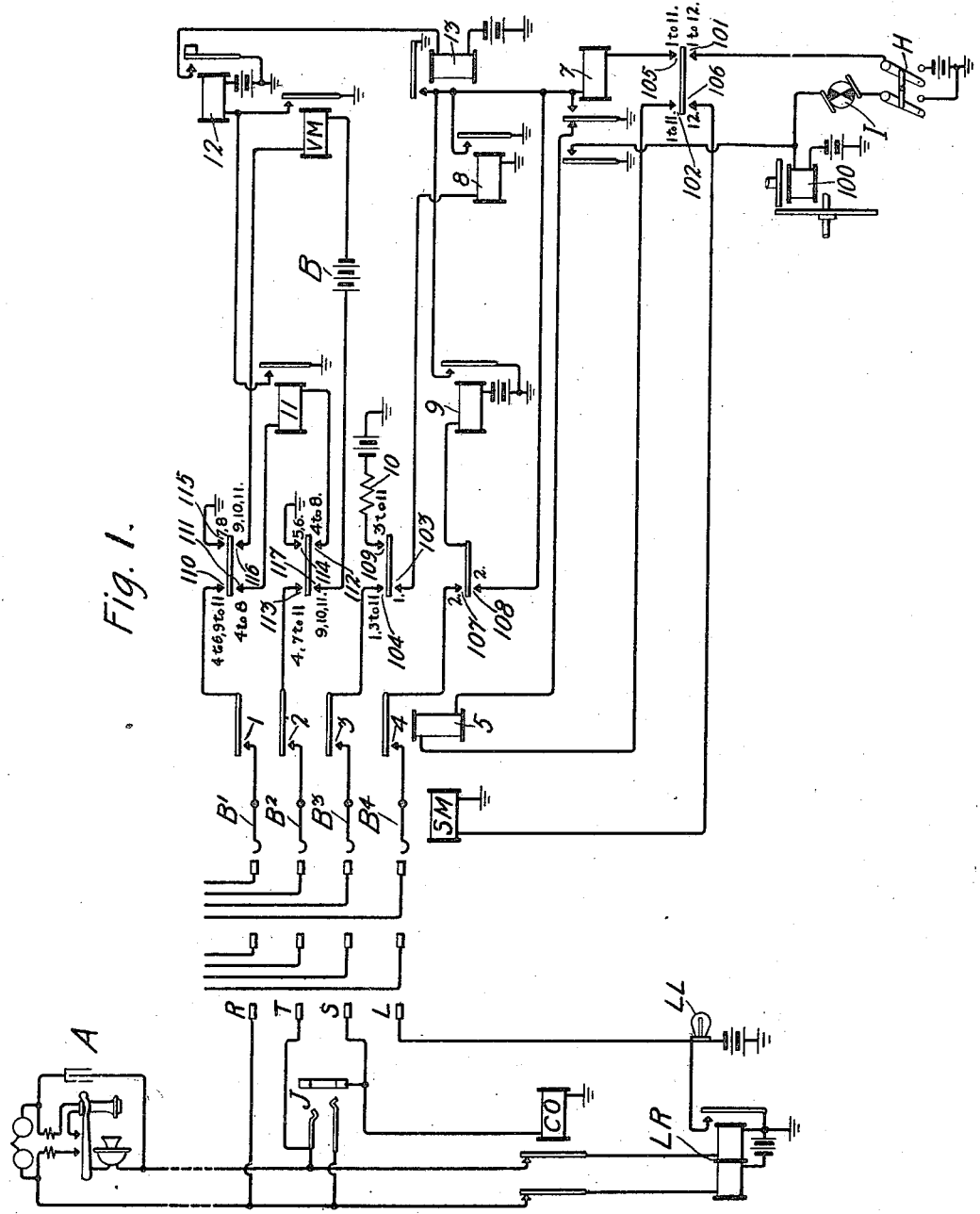

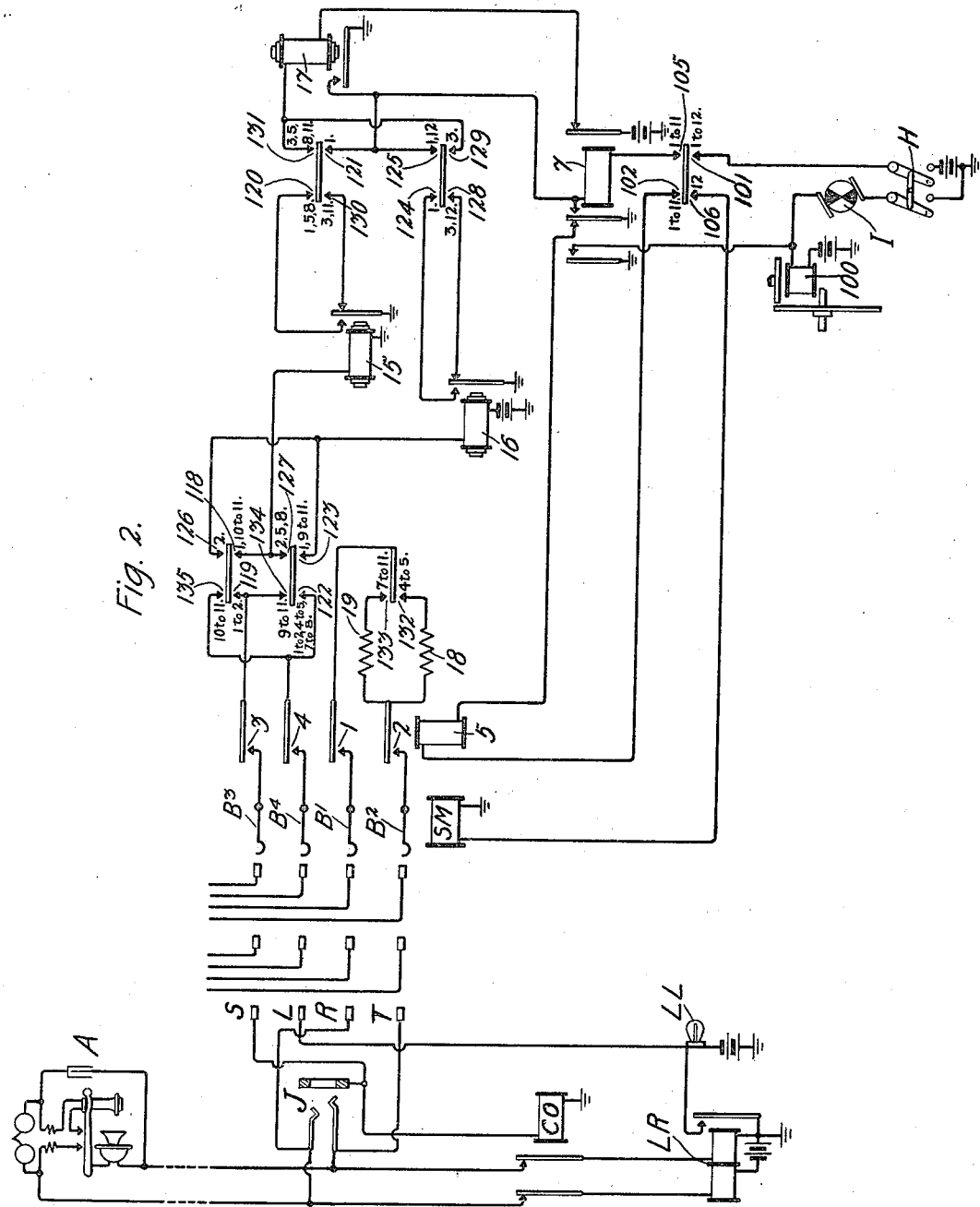

HENRY PETER CLAUSEN, OF MOUNT VERNON, NEW YORK, ASSIGNOR TO WESTERN ELECTRIC COMPANY, INCORPORATED, OF NEW YORK, N. Y., A CORPORATION OF NEW YORK.

AUTOMATIC TESTING SYSTEM.

1,232,498.  Specification of Letters Patent.  Patented July 10, 1917.

Application filed August 30, 1916. Serial No. 117,622.

*To all whom it may concern:*

Be it known that I, HENRY P. CLAUSEN, a citizen of the United States, residing at Mount Vernon, in the county of Westchester and State of New York, have invented certain new and useful Improvements in Automatic Testing Systems, of which the following is a full, clear, concise, and exact description.

This invention relates to an automatic testing system, and more particularly to an arrangement for locating unstandard conditions in electrical circuits and apparatus.

It is an object of the present invention to provide an automatic arrangement which will perform a series of routine testing operations and record separately each unstandard condition found, which operations have heretofore been performed manually.

In an electrical system where a large number of circuits and a large quantity of apparatus is used, such as in telephone exchange systems, it is necessary, in order to render the best service to the subscribers, to maintain a constant supervision of the condition of such circuits and apparatus. This supervision has heretofore taken the form of periodic tests by means of manually operated testing instruments in the hands of more or less skilful attendants. The lack of interest attached to such routine tests, the poor judgment often displayed by such attendants and the great length of time consumed in making these tests have heretofore contributed to a poor service being rendered the subscribers. The time elapsing between the occurrence and the detection and remedy of an unstandard condition in a circuit or piece of apparatus has often been unreasonably long. Moreover, subscribers have often had their service interrupted by the faulty manipulations of such testing instruments.

A feature of the present invention is the provision of means for detecting unstandard conditions in telephone lines and apparatus associated therewith at the central exchange. In accordance with this feature of the invention an arrangement is provided which is adapted to automatically test for and detect not only unstandard conditions in the electrical circuits under test, but also unstandard mechanical conditions in the line and cut-off relays as well as the usual signal controlled by said relays.

Another feature of this invention is the provision of means for making a record of the first unstandard condition encountered on each line, and means operated thereby to cause the abandonment of further tests on such line and to bring about the forward movement of the testing arrangement into connection with the terminals of the next line to be tested.

A further feature of the invention is the provision of means for determining if the line is in use, and means operated thereby to cause the abandonment of further tests on those lines which prove to be in such condition, thereby automatically guarding against any interruption to the service.

Although only a limited number of tests for unstandard conditions in the telephone lines and associated apparatus will be described, it is conceivable that all of the ordinary tests usually performed manually and known commonly as routine tests may be performed by the arrangement herein described. Therefore, the scope of this invention is not to be limited except by the appended claims.

It is thought the invention may best be understood by reference to the accompanying drawings, in which Figure 1 diagrammatically represents a complete testing equipment adapted to perform certain routine tests; and Fig. 2 represents a modified testing equipment adapted to perform other routine tests. For simplicity one certain class of tests, namely, tests for unstandard conditions in the subscriber's line circuit outside of the central office, have been provided for in the arrangement shown in Fig. 1 and another class, although closely allied with the first, in this case, tests for unstandard conditions in the subscriber's line circuit inside of the central office, have been provided for in the arrangement shown in Fig. 2. It will be readily understood that the general method of making these tests is substantially the same in each case and may be incorporated in a single testing arrangement.

In the drawings the usual organization of a subscriber's telephone circuit is represented by the substation A, the line relay LR, the cutoff relay CO, the answering jack J, and the line lamp LL. In many telephone exchange systems, certain conductors of such a telephone circuit are brought to a bank of terminals designated tip, ring, sleeve and lamp. To such terminals are multipled the terminals of an automatic switch represented herein as T, R, S and L. Such automatic switch may be of any usual and well-known construction. A stepping magnet SM is provided for moving the brushes B¹, B², B³, and B⁴ forward from contact with one set of such terminals to the next set at the conclusion of the tests on the subscriber's telephone circuit connected with the first set of terminals. A sequence switch also of well-known construction represented by its motor magnet 100 and various contacts numbered 101 to 135 inclusive is employed for successively establishing various connections for purposes to be more definitely described later. An interrupter I, also of any well-known construction is employed for moving the sequence switch forward and is so arranged that it will energize the motor magnet of said sequence switch only long enough to cause the sequence switch to move forward one position at a time.

Referring now particularly to Fig. 1, the circuits established in the system therein represented and the results of the establishment of such circuits may be described as follows.

When it is desired to make a test of the conditions of a group of subscribers' line circuits, a hand-switch H is thrown into its operated position.

A circuit is established from grounded battery, right-hand member of the switch H, sequence switch contact 101, sequence switch contact 102, winding of a magnet 5, normal contact and inner armature of relay 7 to ground. Magnet 5 becomes energized and attracts its armatures to close their contacts 1, 2, 3 and 4, thus connecting the testing circuits to the brushes B¹, B², B³ and B⁴, which in turn connect these testing circuits to the terminals R, T, S and L of a line to be tested.

Upon the closing of contact 3 a circuit is, provided the line under test is idle, established from ground, winding of the relay 8, contact 103, contact 104, contact 3, brush B³, terminal S, and thence from the winding of cut-off relay CO to ground, and since no source of current is included in this circuit, neither of the relays 8 or CO will be energized. If, on the other hand, the line under test is busy, a source of potential will be connected in a well-known manner to terminal S, whereupon current will flow through the circuit just described, energizing relays 8 and CO in parallel. Relay 8 attracts its armature and establishes a circuit from ground, armature and alternate contact of relay 8, winding of relay 7, sequence switch contact 105, sequence switch contact 101, and the right-hand member of switch H to grounded battery. Relay 7 becomes energized and closes a locking circuit for itself from ground through its inner armature and alternate contact, its winding, and thence through the circuit just described. At the same time the energizing circuit for relay 5 is broken at the inner armature and normal contact of relay 7, whereupon the contacts 1, 2, 3, and 4 are opened. A third circuit is established from ground, the outer armature and alternate contact of relay 7, the winding of motor magnet of sequence switch 100 to grounded battery, whereupon sequence switch will move rapidly through all of its positions until such a one is reached, where the holding circuit for relay 7 is broken. This occurs in position 12 of the sequence switch 100 at its contact 105, and will therefore leave the sequence switch in position 12. A circuit is thereupon established from grounded battery, right hand member of switch H to sequence switch contact 101, sequence switch contact 106, through the winding of stepping magnet SM to ground, resulting in the movement of the brushes B¹, B², B³, and B⁴, from the terminals of the line under test to the next succeeding set of terminals, whereupon a test of the new line is begun.

We will assume in this case that the subscriber's line circuit is not busy, therefore, relay 8 will not become energized as before, but when the interrupter I reaches a circuit-closing position, a circuit will be established from ground, left-hand member of switch H, interrupter I, winding of the motor magnet of sequence switch 100 to grounded battery, stepping it into the second position.

Let us suppose in this case that a call is being initiated on the line under test, but has not yet been answered by the operator. The line relay LR will be energized in the well-known manner, and a circuit will be established from ground, armature and contact of relay LR, the terminal L, the brush B⁴, the sequence switch contact 107, the winding of relay 9 to grounded battery. Relay 9 attracts its armature and establishes a locking circuit for itself from grounded battery, winding of relay 9, sequence switch contact 108, contact and armature of relay 9 to ground. At the same time a circuit is established from ground, armature and contact of relay 9, the winding of relay 7, sequence switch contacts 105 and 101, the right-hand member of switch H to grounded battery. This results in the same action as before, and impels the switch testing device to move forward to another line in order not to disturb the subscriber who is initiating a call on this line.

Let us assume that on the third line tested, it is neither busy, nor is a call being initiated. In positions 1 and 2 of the sequence switch 100, therefore, relay 7 will not be energized, and position 3 will be reached without any of the actions heretofore described. In this position a circuit will be established from grounded battery, resistance 10, sequence switch contact 109, sequence switch contact 104, contact 3, brush B³, terminal S, the winding of cut-off relay CO to ground. The consequent energization of cut-off relay CO puts the line under test in the condition of a busy line, and prevents the establishment of an ordinary connection by an operator or an automatic switch during the further conduct of the test. When position 4 is reached, relay 11 will be bridged across the subscriber's line through a circuit from one line conductor, the terminal R, the brush B¹, the contact 1, sequence switch contact 110, sequence switch contact 111, relay 11, sequence switch contact 112, sequence switch contact 113, contact 2, brush B², terminal T to the other line conductor. Under ordinary conditions relay 11 will remain in its deënergized state, but if there is a foreign source of current connected to the two limbs of the subscriber's line or if cut-off relay CO should fail to operate its contacts, thereby establishing an unstandard condition on the subscriber's line circuit, ground will be supplied through the windings of line relay LR to two sides of the subscriber's line, relay 11 will be energized therethrough. A circuit will thereupon be established from ground, armature and contact of relay 11, winding of slow-acting relay 12 to grounded battery. The energization of this relay 12 will, in turn, establish a circuit from ground, armature and contact of relay 12, winding of printer magnet 13 to grounded battery. Printer magnet 13 will operate any well-known form of stylus (not shown) to make a record of the unstandard condition. Printer magnet 13 will at the same time establish a circuit from ground, its armature and contact, winding of the relay 7, and thence through the circuit previously traced, energizing thereby the relay 7, which performs the "wipe out" function previously described.

As before stated, if cut-off relay CO has operated in the proper manner, and if there is no foreign source of potential connected with the lines of the subscriber's telephone circuit, then relay 11 will not be energized and in due course of time the sequence switch 100 will move under control of interrupter I into its 5th position. In this position a circuit will be established from ground, sequence switch contact 114, sequence switch contact 112, winding of magnet 11, sequence switch contact 111, sequence switch contact 110, contact 1, brush B¹, terminal R, to the ring side of the line. Under standard conditions, no current will flow through this circuit. If, on the other hand, battery from the line relay LR through the "ring contact" of the cut-off relay CO is supplied to the line, or if there is any foreign source of current connected to this "ring-side" of the line, then relay 11 will become energized and a record will be made of such unstandard condition in the manner heretofore described. Also, relay 7 becomes energized as before to impel the sequence switch 100 forward to test a new line.

Due to the inclusion of a slow-acting relay 12 in the circuit established from the armature and contact of relay 11, the circuit for testing the ring-side of the line is maintained during the 5th and 6th positions of the sequence switch.

When the 7th position is reached, a circuit is established for a similar test of the tip-side of the line. This circuit extends from ground, sequence switch contact 115, sequence switch contact 111, winding of relay 11, sequence switch contact 112, sequence switch contact 113, contact 2, brush B², terminal T to the tip-side of the line. A similar unstandard condition on this line will cause the making of a record and the forward movement of the sequence switch as heretofore described. In like manner, this circuit is maintained through positions 7 and 8.

In position 9, and continuing through positions 10 and 11, a circuit is established from the ring-side of the line, terminal R, brush B¹, contact 1, sequence switch contact 110, sequence switch contact 116, voltmeter relay VM, testing battery B, sequence switch contact 117, contact 2, brush B², terminal T, to the tip side of the line.

Due to the delicate nature of the voltmeter relay VM, and a possible charged condition of the condenser in the subscriber's substation circuit, a momentary circuit may be established from ground, through armature and contact of relay VM, the winding of slow-acting relay 12, to grounded battery, but, since this is only of slight duration, the relay 12 will not establish a circuit through its armature and contact. If the insulation between the lines of the subscriber's circuit is high enough, so that a standard condition exists, the voltmeter relay VM will not close its contact. If, on the other hand, the insulation resistance between the lines of the subscriber's telephone circuit is so low that an unstandard condition exists, then sufficient current will flow through the relay VM and the circuit described, to cause the establishment of a continuous energizing circuit for slow-acting relay 12. In a manner similar to that described heretofore, slow-acting relay 12 will cause the making of a record of such an unstandard condition by the energization of printer magnet 13.

Assuming now that no unstandard condition has been found in any of the tests made, and that in the ordinary course of events the sequence switch 100 has passed out of its 11th and into its 12th position, a circuit will be established from grounded battery, the right-hand member of switch H, sequence switch contact 101, sequence switch contact 106, the winding of stepping magnet SM to ground. The stepping magnet SM impels the brushes $B^1$, $B^2$, $B^3$ and $B^4$ forward into another set of terminals, whereupon the tests described are repeated.

Referring now particularly to Fig. 2, the circuits established in the system therein represented, and the results of the establishment of such circuits may be described as follows.

When it is desired to make a test of the condition of the subscriber's telephone circuit within the central office, hand switch H is thrown into its operated position, whereupon a circuit is established from grounded battery, right-hand member of the hand switch H, sequence switch contact 101, sequence switch contact 102, winding of the magnet 5, normal contact and inner armature of the magnet 7 to ground. Magnet 5 attracts its armatures and closes the contacts 1, 2, 3 and 4. A circuit is established from the winding of the slow-release relay 15, sequence switch contact 118, sequence switch contact 119, contact 1, brush $B^3$, terminal S, winding of cut-off relay CO to ground. Under standard conditions neither relay 15 nor CO is energized. If, on the other hand, the subscriber's line is busy, its condition being signified by the presence of a potential other than ground on the terminal S, then current will flow, as a result of this potential, through the winding of relays 15 and CO in parallel, thereby energizing them. Relay 15 will attract its armature and establish a circuit from ground, armature and alternate contact of relay 15, sequence switch contact 120, sequence switch contact 121, winding of relay 7, sequence switch contact 105, sequence switch contact 101, through the right-hand armature of the switch H to grounded battery. Relay 7 will attract its armatures, and complete a locking circuit for itself from ground, inner right-hand armature and alternate contact of relay 7, through the winding of relay 7, and over the circuit just traced. The circuit for magnet 5, whereby the testing arrangements are connected to the brushes $B^1$, $B^2$, $B^3$ and $B^4$ and the telephone circuit under test, is opened at the normal contact and inner left-hand armature of relay 7. Another circuit is established from ground, outer left-hand armature and alternate contact of relay 7, to the winding of sequence switch magnet 100 and grounded battery, whereby the sequence switch 100 is driven forward until the holding circuit for relay 7 is broken. This happens as the sequence switch leaves position 11 and enters position 12 at the sequence switch contact 105. Thereupon a circuit is established from grounded battery, right-hand member of switch H, sequence switch contact 111, sequence switch contact 106 to the winding of the stepping magnet SM, to ground. Stepping magnet SM impels the brushes $B^1$, $B^2$, $B^3$ and $B^4$ forward into the next set of telephone circuit terminals T, R, S, and L.

If the line is not busy, but if on the other hand, is in a condition where a call is being initiated, and line relay LR is in its energizing condition, a circuit will be set up from ground, armature and contact of relay LR, terminal L, brush 4, contact 4, sequence switch contact 122, sequence switch contact 123, winding of slow-release relay 16 to grounded battery. Slow-release relay 16 attracts its armature and completes a circuit from ground, armature and alternate contact of relay 16, sequence switch contact 124, sequence switch contact 125 to the winding of relay 7, and grounded battery, over the circuit previously traced. This results in the same action as the energization of relay 15, that is, further tests on this line are abandoned, and a new set of terminals T, R, S and L, is seized.

Let us assume now that no unstandard conditions have, up to this time, been found. In due course of events, sequence switch 100 will move its contacts into position 2, whereupon a circuit is established from grounded battery, winding of slow-release relay 16, sequence switch contact 126, sequence switch contact 119, contact 3, brush $B^3$, terminal S, winding of cut-off relay CO to ground. This results in the energization of relays 16 and CO, but not the establishment of a circuit through relay 7 as before described, since the sequence switch contacts 124 and 125 are opened in position 2. A circuit is also established from ground, winding of relay 15, sequence switch contact 127, sequence switch contact 122, contact 4, brush $B^4$, terminal L, line lamp LL to grounded battery. Slow-release relay 15 is energized, and attracts its armature, but does not complete a circuit for relay 7 as before. These being standard conditions, sequence switch 100 will move in the regular way into position 3, and thence into position 4. If, on the other hand, the circuit of cut-off relay CO had been opened between ground and the terminal S, relay 16 would not have been energized, and in position 3 a circuit would have been established from ground, armature and normal contact of relay 16, sequence switch contact 128, sequence switch contact 129, through the winding of printer magnet 17, to the normal contact and right-hand armature of relay 7, and thence to grounded battery. Printer magnet 17 will operate any well-known form of stylus (not shown) to make a record of the unstandard condition. At the same time it will attract an armature and establish a circuit from ground, armature and contact of magnet 13, winding of relay 7 to grounded battery, over the circuit previously traced. Thereupon the further conduct of the test will be abandoned in the manner previously described, and the brushes B¹, B², B³ and B⁴ will be impelled forward to the next set of terminals T, R, S, and L. Printer magnet 17 is preferably made a slow-release magnet, so that as it energizes magnet 7, and as magnet 7 in turn deënergizes magnet 13, the stylus worked by magnet 13 may have a long enough time interval to make a sufficiently clear and distinct record.

Suppose the circuit extending through brush B³ had revealed a standard condition, but the circuit extending through brush B⁴ had revealed an unstandard condition, such as an open circuit in line lamp LL, caused either by the burning out of this lamp or its absence, then relay 15 would not have been energized. In this case, a circuit would be established from ground, armature and normal contact of relay 15, sequence switch contact 130, sequence switch contact 131, winding of printer magnet 17, the contact and left-hand armature of relay 7 to grounded battery, resulting in the making of a record of the unstandard condition and the abandonment of the further conduct of the test as before described.

Let us assume that in the regular course of events, sequence switch 100 has moved into the 4th position. A circuit will thereupon be closed from grounded battery, left-hand winding of relay LR, through the armature and ring (outer) contact of cut-off relay CO, terminal R, brush B¹, contact 1, sequence switch contact 132, resistance 18, contact 2, brush B², terminal T, the tip (inner) contact and armature of cut-off relay CO, the right-hand winding of relay LR to ground. Through this circuit line relay LR is energized and attracts its armature.

It should be noted at this point that the resistance 18 is of a low value, its object being to cause a "soaking" current to flow through the relay LR, while the resistance 19, which replaces resistance 18 as described later, is of a high resistance and designed to test the action of the line relay on a small value of current. Sequence switch 100 moves in the regular course of events into position 5, where any unstandard condition found in position 4 is recorded. Such unstandard condition might be the failure of line relay LR to respond to the "soaking" current. In that case, a circuit will be established from ground through the slow-release relay 15, sequence switch contact 127, sequence switch contact 122, contact 4, brush B⁴, terminal L, line lamp LL to grounded battery. Relay 15 attracts its armature and establishes a circuit from ground, armature and contact of relay 15, sequence switch contact 120, sequence switch contact 131, winding of the printer magnet 17, contact and right-hand armature of relay 7 and thence to grounded battery over the circuit previously traced, resulting as before described in the making of a record of such unstandard condition, and the abandonment of the further progress of the test If line relay LR had responded in the proper manner, and established a standard condition, then relay 15 would have been shunted through the armature and contact of relay LR and no record would have been made.

Sequence switch 100, still under control of the interrupter I, would next move into position 6, in which position the resistance 18 bridged across the subscriber's telephone line circuit would have been removed at sequence switch contact 132. In the next position 7, sequence switch contact 133 would be closed, and the high resistance would replace the low resistance 18 as before described. Line relay LR will respond to current flowing through its windings and the high resistance 19, such being a standard condition. If line relay LR does not respond, and sets up an unstandard condition, the same will be recorded through the circuits in the manner before described, this record being made when sequence switch 100 moves into position 8.

Suppose no unstandard condition has been found up to this time, and that sequence switch moves into position 9. A circuit will be established from ground battery, winding of relay 16, sequence switch contact 123, sequence switch contact 134, contact 3, brush B³, terminal S, winding of cut-off relay CO to ground. Current flows through this circuit to energize relays 16 and CO. This condition is maintained through position 10, into which sequence switch 100 moves. An additional circuit is established from grounded battery line lamp LL, terminal L, brush B⁴, contact 4, sequence switch contact 135, sequence switch contact 118, winding of relay 15 to ground. Relay 15 responds by attracting its armature. Sequence switch 100 moves into position 11, in which position the two circuits just described for energizing relays 15 and 16 are still maintained. A standard condition will now consist in the opening of the energizing circuit for line relay LR through the actuation of the armatures of the cut-off relay CO. An unstandard condition would be the failure of the cut-off relay CO to move its armatures. Since the resistance 19 is still bridged across a subscriber's line circuit, line relay LR will have current flowing through its windings, and consequently will hold its armature in an attracted position. In this case, relay 15 will be shunted through the armature and contact of line relay LR, and hence a circuit will be established from ground, armature and normal contact of relay 15, sequence switch contact 136, sequence switch contact 131, winding of the printer magnet 17, and thence to battery through the circuit as previously traced. This results in the making of a record of the unstandard condition, and the abandonment of any further tests in a manner similar to that previously described.

If only standard conditions have been found, sequence switch 100 will move, in the regular course of events into position 12. In moving out of position 11, circuit for magnet 5 is broken at sequence switch contact 102, and the contacts 1, 2, 3 and 4 are opened. As the sequence switch 100 moves into position 12, a circuit is established from grounded battery, right-hand member of hand switch H, sequence switch contact 101, sequence switch contact 106, winding of stepping magnet SM to ground whereupon the brushes B¹, B², B³ and B⁴ are impelled forward to the next set of telephone circuit terminals T, R, S and L, to make tests similar to those described on another subscriber's telephone circuit.

What is claimed is:

1. An arrangement for testing telephone lines, comprising automatically controlled testing means responsive to a plurality of different electrical conditions indicating unstandard conditions on such lines, and means for automatically associating such testing means with the line to be tested.

2. An arrangement for testing telephone lines, comprising automatic testing means responsive to a plurality of different electrical conditions indicating unstandard conditions in different parts of said lines, and means for automatically and successively associating such testing means with the different parts of the line to be tested.

3. An arrangement for testing the condition of telephone lines comprising testing means responsive to a plurality of different electrical conditions indicating unstandard conditions on said lines, means controlled thereby for recording an unstandard condition, means responsive to a busy condition of said line, and means controlled by the last mentioned means and the said recording means for preventing further conduct of the test.

4. In an automatic testing system, sets of terminals connected with telephone line circuits, an arrangement for detecting and recording unstandard conditions in said circuits, means for successively and automatically testing various parts of said circuits, and means for successively and automatically advancing said arrangement from connection with one set of said terminals to another set of said terminals.

5. In an automatic testing system, sets of terminals connected to telephone line circuits, an arrangement for detecting and recording unstandard conditions in said circuits comprising brushes arranged to be successively and automatically connected to said sets of terminals, means for successively and automatically testing a plurality of parts of said circuits, means responsive to an electrical condition indicating an unstandard condition in any one of said parts of said circuit to record the presence of said unstandard condition, and means responsive to said recording means for preventing the further operation of said testing means.

6. In an automatic testing system, sets of terminals connected to telephone line circuits, an arrangement for detecting and recording unstandard conditions in said circuits comprising brushes arranged to be successively and automatically connected to said sets of said terminals, means for successively and automatically testing the plurality of parts of said circuits, means responsive to a busy condition of said circuits to prevent the further operation of said testing means, and means responsive to an electrical condition indicating an unstandard condition in any one of said parts of said circuit for making a record of such condition and to prevent the further operation of said testing means.

7. In an automatic testing system, sets of terminals connected with telephone line circuits and apparatus, an arrangement for detecting and recording unstandard conditions, said arrangement comprising means for making routine tests on said circuits and apparatus, means responsive to standard conditions to advance said arrangement through a complete cycle of tests and thence from connection with one set of said terminals to another set of said terminals, means responsive to standard busy conditions to cause said arrangement to abandon further tests and advance immediately from connection with one set of said terminals to another set of said terminals, and means responsive to unstandard conditions to record such conditions, abandon the further tests, and advance the arrangement immediately from connection with one set of said terminals to another set of said terminals.

8. In an automatic testing system, sets of terminals connected to telephone line circuits, a testing mechanism for detecting and recording unstandard conditions in said circuits arranged to successively and automatically test a plurality of parts of one of said circuits, comprising brushes, a brush shifting means arranged to successively and automatically connect said brushes to said sets of terminals, means responsive to a busy condition of said circuits, said means preventing the operation of said testing mechanism and increasing the operation of said brush shifting means, means responsive to standard conditions for causing the operation of said brush shifting means, and means responsive to unstandard conditions, said means operating to prevent the further sequence of tests and to increase the rate of operation of said brush shifting means.

In witness whereof, I hereunto subscribe my name this 28th day of August A. D., 1916.

HENRY PETER CLAUSEN.